Figure 1:
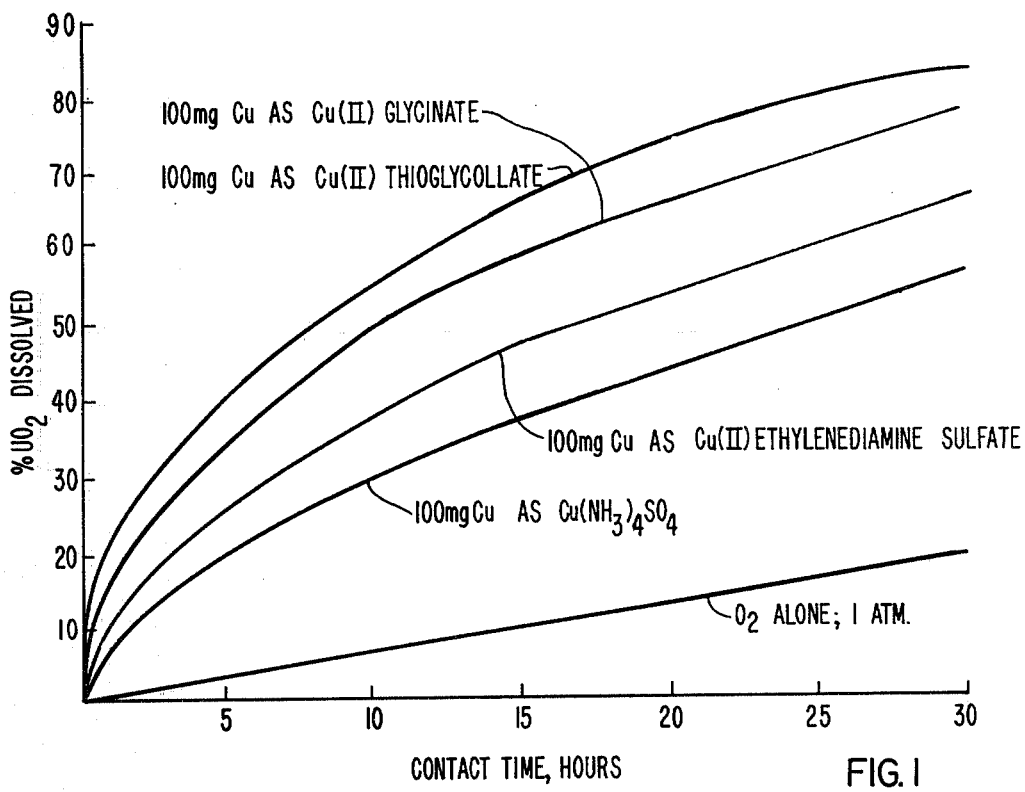

United States Patent [19]

Jackovitz et al.

[11] 4,200,337
[45] Apr. 29, 1980

[54] CATALYSES OF URANIUM OXIDATION

[75] Inventors: John F. Jackovitz, Monroeville Boro.; Earl A. Pantier, Penn Hills Township, Allegheny County, both of Pa.

[73] Assignee: Westinghouse Electric Corp., Pittsburgh, Pa.

[21] Appl. No.: 915,647

[22] Filed: Jun. 15, 1978

[51] Int. Cl.$^2$ .................. E21C 41/14; C01G 56/00
[52] U.S. Cl. ........................................ 299/5; 252/186; 423/7; 423/17; 423/20
[58] Field of Search ............... 252/186; 423/7, 17, 423/20; 299/4, 5

[56] References Cited

U.S. PATENT DOCUMENTS

| | | | |
|---|---|---|---|
| 1,999,807 | 4/1935 | Gibbs | 423/3 |
| 2,863,717 | 12/1958 | Kunin | 423/7 |
| 2,869,930 | 7/1959 | Menke | 299/5 |
| 3,003,848 | 10/1961 | Hillyer | 423/3 |
| 3,017,241 | 1/1962 | McLean | 423/17 |
| 3,036,881 | 5/1962 | Clifford | 423/3 |
| 3,081,149 | 3/1963 | Haas | 423/3 |
| 3,175,878 | 3/1965 | Hillyer | 423/3 |
| 3,778,498 | 12/1973 | Yano et al. | 423/7 |
| 3,792,903 | 2/1974 | Rhoades | 423/17 X |

Primary Examiner—Richard E. Schafer
Attorney, Agent, or Firm—R. D. Fuerle

[57] ABSTRACT

The oxidation of uranium is catalyzed with water-soluble copper or zinc chelates. An aqueous solution is prepared containing carbonate or bicarbonate ion, an oxidizer such as hydrogen peroxide or oxygen, and a water-soluble copper or zinc chelate which has at least two amino, carboxylic acid, or thiocarboxylic acid donor groups. The solution is pumped into an underground deposit of uranium. The water-soluble +4 state uranium is oxidized to the water-soluble +6 state which forms a complex with the carbonate ion. The solution is pumped to the surface and is recycled after precipitation of the uranium.

14 Claims, 5 Drawing Figures

CATALYSES OF URANIUM OXIDATION

BACKGROUND OF THE INVENTION

When uranium is leached from ores during solution mining the hexavalent uranium dissolves into the solution as the stable uranyltricarbonate complex anion, $UO_2(CO_3)_3^{4-}$. The tetravalent uranium found in ores such as coffinite, pitchblende, and uraninite does not dissolve in the leaching solution and must be oxidized to the soluble hexavalent state. Chemical oxidants such as hydrogen peroxide, sodium hypochlorite, and potassium permanganate can be used for this purpose but they are expensive and difficult to regenerate.

SUMMARY OF THE INVENTION

We have found that certain chelates of copper and zinc catalyze the oxidation of tetravalent uranium in underground solution mining processes. Unlike copper ammonia complexes, which have also been used as oxidation catalysts, the chelates of this invention are remarkably stable and do not precipitate with the uranium. They can be readily made from commercially available starting materials and are relatively inexpensive.

PRIOR ART

U.S. Pat. No. 3,036,881 discloses the use of a copper ammonia chelate to catalyze the oxidation of uranium in a carbonate solution.

U.S. Pat. No. 3,778,498 discloses the use of a titanium chelate for recovering uranium from a sodium carbonate solution.

U.S. Pat. No. 2,863,717 discloses the removal of uranium and copper from contaminated systems by chelation.

DESCRIPTION OF THE INVENTION

FIGS. 1, 2, 3, 4, and 5 are graphs which plot the results of examples illustrating the effects of the chelates of this invention on the oxidation and extraction of uranium.

The chelates of this invention must be water-soluble because solution mining is done with aqueous solutions. They are prepared by mixing together in water a chelating agent and a stoichiometric quantity of a source of copper or zinc ions such as copper or zinc sulphate, nitrate, or chloride, although the carbonates are preferred as they produce only carbon dioxide and do not pollute the environment. Copper ions are preferred to zinc ions because their chelates have higher extraction coefficients.

The chelating agent may be a bidentate, a tridentate, a quadradentate, a pentadentate, or a hexadentate, which means that it has 2, 3, 4, 5, or 6 donor groups, respectively. The donor groups must be amino, carboxylic, or thiocarboxylic or a mixture thereof as these are the only donor groups which have been found to work satisfactorily. Suitable bidentates include ethylene diamine, thioglycolline, and glycine and other α-amino acids such as alanine, α-alanine, and leucine. Nitrilotriacetic acid is a tridentate, triethylenetetramine is a quadradentate, tetraethylene pentamine is a pentadentate, and ethylene diamine tetraacetic acid is a hexadentate. Bidentates are preferred because they have the highest extraction coefficients. Of the copper chelates, copper glycinate is preferred for its high extraction coefficient, its high solubility and stability, and its inexpensiveness, and of the zinc chelates zinc ethylene diamine is preferred for similar reasons.

The following are the formulae for chelates studied, where M is Cu or Zn.

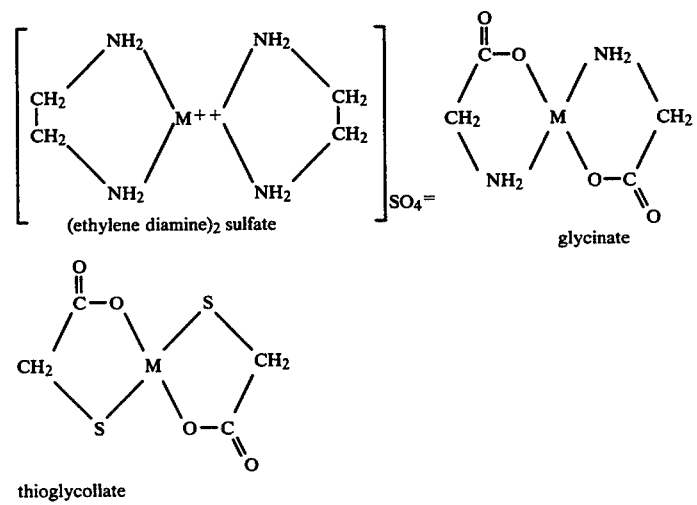

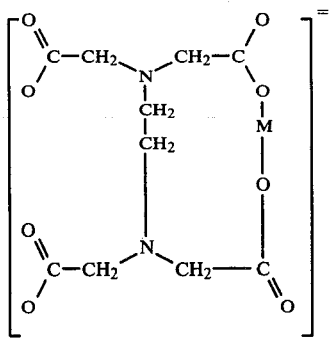

ethylene diamine tetra acetic acid

The amount of chelate in the solution depends upon the particular ground conditions encountered, but about 10 to 100 milligrams of the metal catalyst (in the chelate) per liter is usually satisfactory. If less is used, the effectiveness of the catalyst is less and if more is used there is no noticeable increase in effectiveness and it may, in fact, even decrease. Alternatively, the amount of catalyst used can be based on the amount of ore to be treated. About 0.05 to about 1 pound of copper or zinc (in the chelate) per ton of ore (which may contain only 2 pounds of uranium) is usually a satisfactory amount.

The leaching solution must also contain an oxidizing agent. The oxidants most acceptable are hydrogen peroxide, oxygen, or air. Hydrogen peroxide gives the highest leaching rate but oxygen is preferred due to cost. The concentration of hydrogen peroxide in solution for acceptable leaching rate is in the range of 0.25 to 2.0 g/liter. If oxygen is used, the rate of leaching increases with pressure. The solubility of oxygen at 1 atmosphere is approximately 50 ppm while at 10 atmospheres the solubility in the aqueous solution is about $\alpha 40$ ppm. In actual solution mining the ore bodies lie between 200 and 300 feet below the surface so that pressures are between 7 and 10 atmospheres.

The solution also contains a source of carbonate or bicarbonate ions such as sodium or ammonium carbonate. Because carbonate and bicarbonate are in equilibrium in solution, either ion may be used and either is roughly equivalent to the other. The amount of bicarbonate ion that has been found to be satisfactory is about 0.5 to about 4 grams per liter.

After the solution of water, chelate, oxidizing agent, and bicarbonate ion has been prepared it is pumped into the underground deposit of uranium and is later pumped back up to the surface, usually by way of other holes. The recovered solution is then treated by passing through an ion exchange resin to remove the uranium in it. The remaining solution is replenished with oxidizer, chelate, or bicarbonate ion, if their quantities have been depleted, and is returned to the underground deposit. The solution is recycled until the underground deposit is exhausted of economically recoverable uranium.

The following examples further illustrate this invention.

EXAMPLE 1

One gram of $UO_2$ powder was placed in 100 ml aqueous solutions of 0.15 M $(NH_4)_2CO_3$ containing 100 mg of copper in various copper chelates. The solutions were exposed to oxygen at one atmosphere (=48 ppm). After various lengths of time the amount of $UO_2$ which had been dissolved was determined. FIG. 1 compares the percent $UO_2$ dissolved for the chelates copper thioglycollate, copper glycinate, copper ethylene diamine sulfate, and copper ammonium sulfate to the control which contained no chelate. The graph shows the effectiveness of the chelate in catalyzing the oxidation of the uranium. Although copper thioglycollate was more effective than copper glycinate, the latter is preferred as it is more stable. Not only was copper ammonium sulfate less effective but it was also so unstable that it was not suitable as a chelate.

EXAMPLE 2

Figure 2:
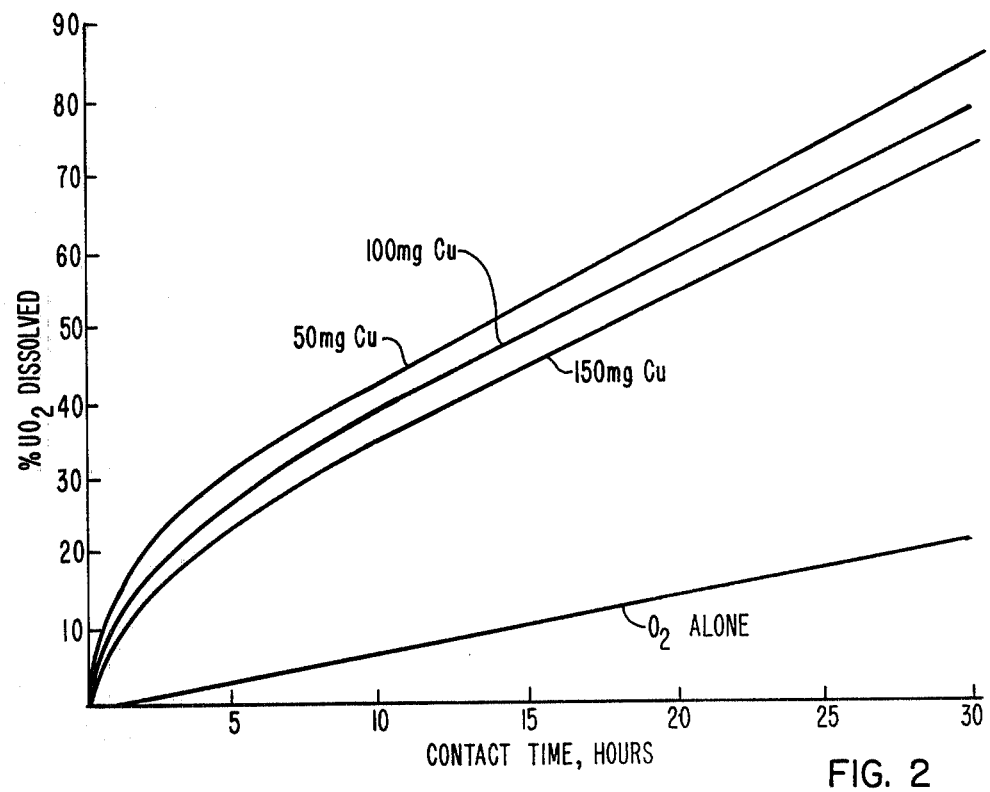

Example 1 was repeated using 1 gm $UO_2$ in 100 ml of water containing 0.15 M $(NH_4)_2CO_3$ and 50, 100, and 150 mg. of copper as copper glycinate under 1 atmosphere $O_2$. FIG. 2 graphically shows the results. The larger amounts of chelate performed poorer apparently because the chelate molecules are interfering with each other.

EXAMPLE 3

Figure 3:
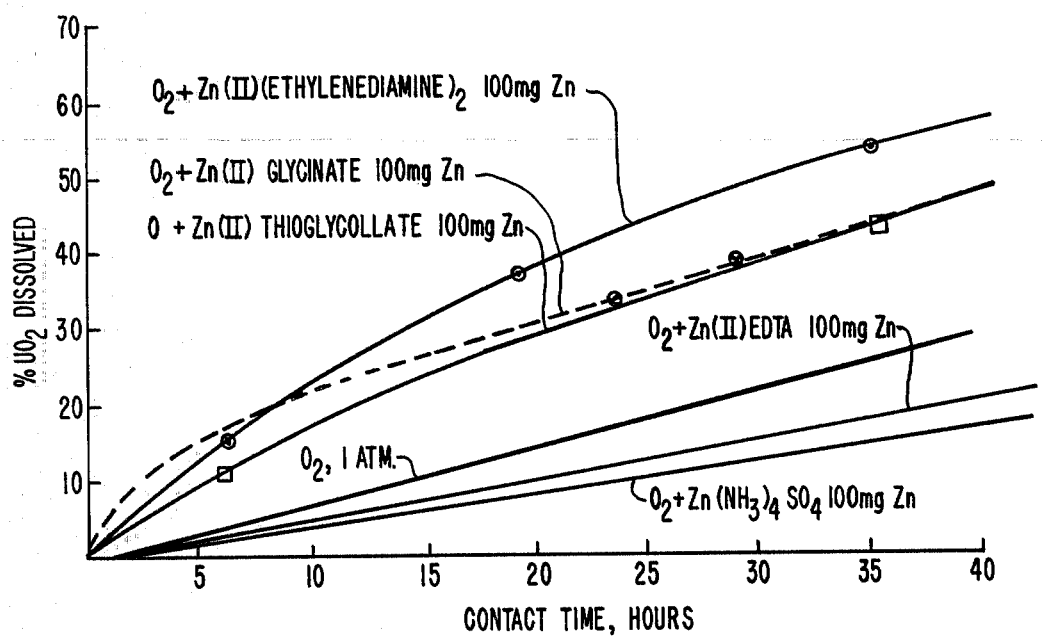

Example 1 was repeated using 1 gm $UO_2$ in 100 ml of water containing of 0.15 M $(NH_4)_2CO_3$ with 100 mg Zn as a zinc chelate under 1 atm. $O_2$. The chelates used were zinc ethylenediamine, zinc glycinate, zinc ethylene diamine tetra-acetic acid, and zinc ammonium sulfate. FIG. 3 plots the results and shows that zinc ethylene diamine tetra-acetic acid and zinc ammonium sulfate performed even worse than the control and therefore are unsatisfactory. The poor performance of the zinc ethylene diamine tetra-acetic acid is an anomaly believed to be due to steric hinderance. Zince glycinate is preferred over zinc ethylene diamine because it is more stable.

EXAMPLE 4

Figure 4:
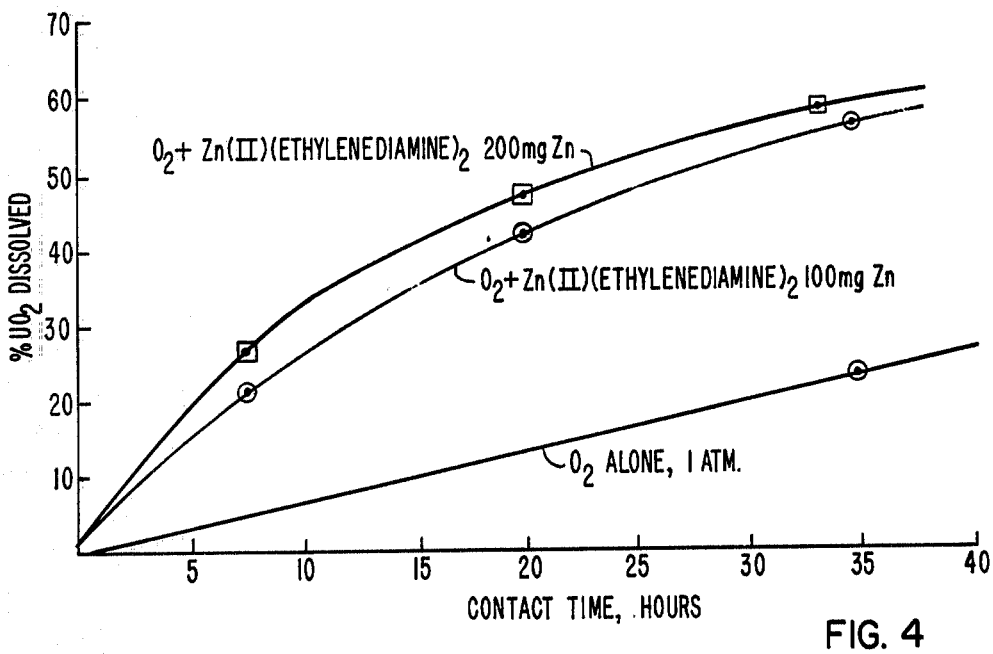

Example 1 was repeated using 1 gm $UO_2$ in 100 ml of water containing 0.15 M $(NH_4)_2CO_3$ with 100 and 200 mg Zn as zinc chelate at 1 atm. $O_2$. FIG. 4 gives the results.

EXAMPLE 5

This example shows the effect of various catalysts in the leaching of a vertical column of 120 gms. Texas uranium sandstone ore containing 20 gms. of ground water. A solution containing 2 g/liter $NH_4HCO_3$, the chelate catalyst, and oxygen at one atmosphere was percolated through the column to simulate the solution mining process of an actual ore body.

Figure 5:
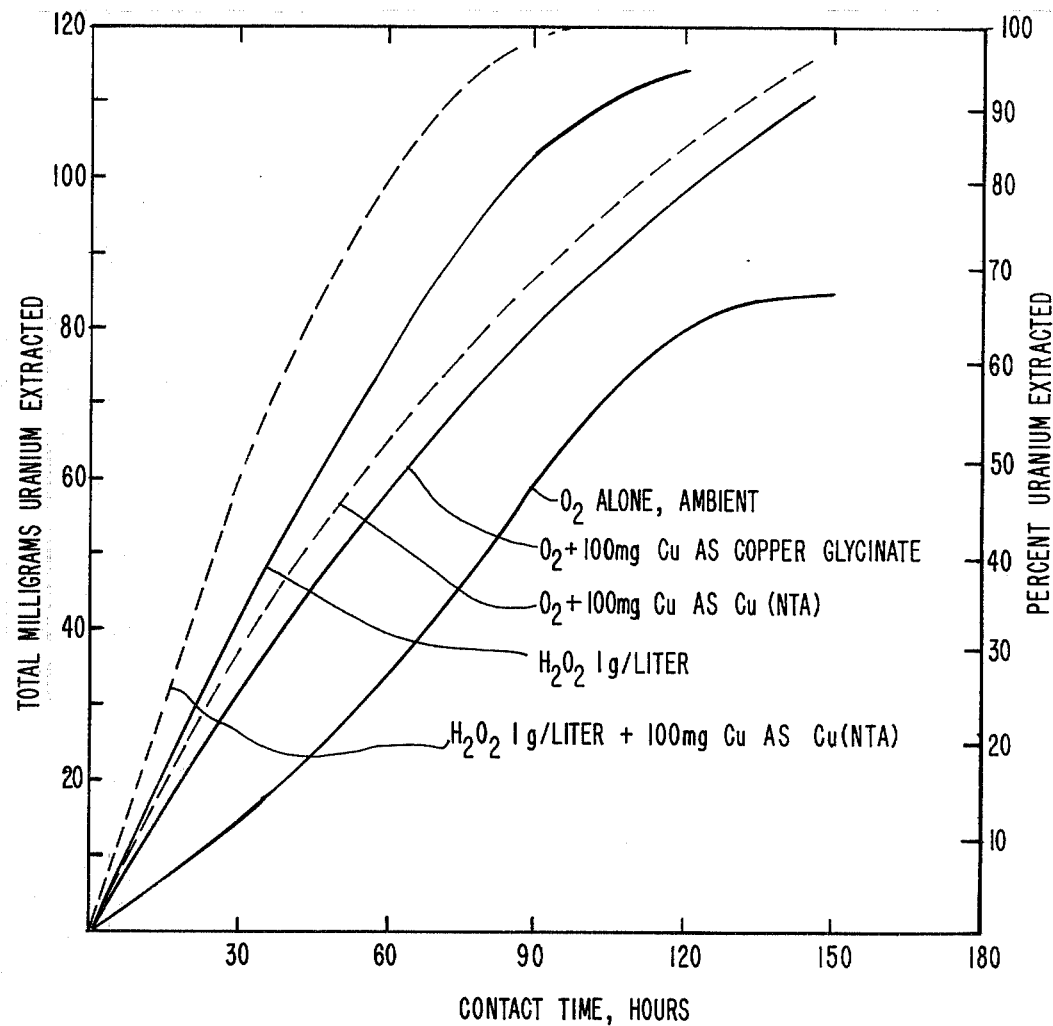

Example 1 was repeated using 1 gm $UO_2$ in 100 ml of water containing 0.15 M $(NH_4)_2CO_3$ with 100 mg Cu as a chelate and either 1 atm of $O_2$ or 1 gm/liter of $H_2O_2$. The chelates used were copper glycinate and copper nitrilo triacetic acid (NTA). Although copper NTA performed better than copper glycinate the latter is preferred because it is less expensive and more environmentally acceptable. FIG. 5 gives the results.

We claim:
1. A composition comprising an aqueous solution of
   (1) a water-soluble copper or zinc chelate which is the reaction product of copper or zinc ion and a bi-, tri-, quadra-, penta-, or hexa- dentate chelating agent, said chelating agent containing at least two donor groups selected from the group consisting of amino, carboxylic acid, thiocarboxylic acid, and mixtures thereof;
   (2) carbonate or bicarbonate ion; and
   (3) an oxidizing agent.
2. A composition according to claim 1 wherein said chelate is the reaction product of a bidentate.
3. A composition according to claim 1 wherein said chelate is a copper chelate.
4. A composition according to claim 3 wherein said copper chelate is copper glycinate.
5. A composition according to claim 1 wherein said chelate is zinc (ethylene diamine)$_2$.
6. A composition according to claim 1 wherein the concentration of said carbonate or bicarbonate ion is about 0.5 to about 4 g/l, the concentration of the metal in said chelate is about 10 to about 100 mg/l, and the concentration of said oxidizing agent is about 0.25 to about 2 gms/l.
7. A composition according to claim 1 wherein said oxidizing agent is selected from the group consisting of $O_2$ and $H_2O_2$.
8. In a process for solution mining uranium by pumping a solution containing an oxidizer and an extractant of carbonate or bicarbonate ion into an underground uranium deposit, a method of catalyzing the oxidation of said uranium by said oxidizer comprising including in said solution a water-soluble copper or zinc chelate which is the reaction product of copper or zinc ion and a bi, tri-, quadra-, penta-, or hexa- dentate chelating agent, said chelating agent containing at least two donor groups selected from the group consisting of amino, carboxylic acid, thiocarboxylic acid, and mixtures thereof.
9. A method according to claim 8 wherein said chelate is the reaction product of a bidentate.
10. A method according to claim 8 wherein said chelate is a copper chelate.
11. A method according to claim 10 wherein said copper chelate is copper glycinate.
12. A method according to claim 8 wherein said chelate is zinc (ethylene diamine)$_2$.
13. A method according to claim 8 wherein the concentration of said carbonate or bicarbonate ion is about 0.5 to about 4 g/l, the concentration of the metal in said chelate is about 10 to about 100 mg/l, and the concentration of said oxidizing agent is about 0.25 to about 2 gms/l.
14. A method according to claim 8 wherein said oxidizer is selected from the group consisting of $O_2$ and $H_2O_2$.

* * * * *